No. 648,730. Patented May 1, 1900.
F. M. EGGERT.
CAR BRAKE.
(Application filed Feb. 17, 1899.)

(No Model.)

Witnesses
A. L. Hadley
H. C. Smith.

Inventor
Francis M. Eggert
By Thos. W. Sprague & Son.
Attys.

UNITED STATES PATENT OFFICE.

FRANZIS M. EGGERT, OF DETROIT, MICHIGAN.

CAR-BRAKE.

SPECIFICATION forming part of Letters Patent No. 648,730, dated May 1, 1900.

Application filed February 17, 1899. Serial No. 705,834. (No model.)

*To all whom it may concern:*

Be it known that I, FRANZIS M. EGGERT, a citizen of the United States, residing at Detroit, in the county of Wayne and State of Michigan, have invented certain new and useful Improvements in Car-Brakes, of which the following is a specification, reference being had therein to the accompanying drawings.

The invention relates generally to car-brakes particularly designed for use upon electrically-operated street-railway cars.

The principal object of my invention is to provide a brake mechanism that will be more effective in its operation than those now in use, and this I accomplish by constructing the said mechanism in such a manner that it may be applied directly to the track instead of exclusively to the wheels, which latter is the ordinary construction, or I may apply said brake mechanism simultaneously to the track and wheels for the purpose of obtaining a maximum amount of friction.

A further object of my invention is to construct the brake mechanism so that the motor and brakes may be operated successively by a single actuating device.

With these objects in view my invention consists in an improved brake mechanism and in the peculiar construction, arrangement, and combination of the various parts thereof, as more fully hereinafter described, and pointed out in the claims.

Figure 1:
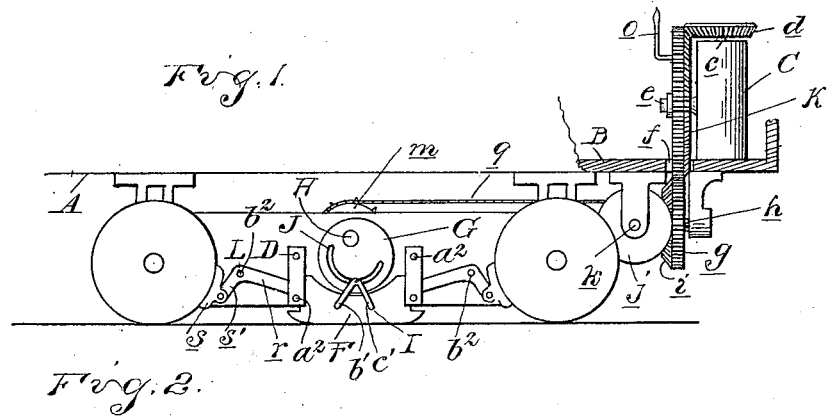
Figure 2:
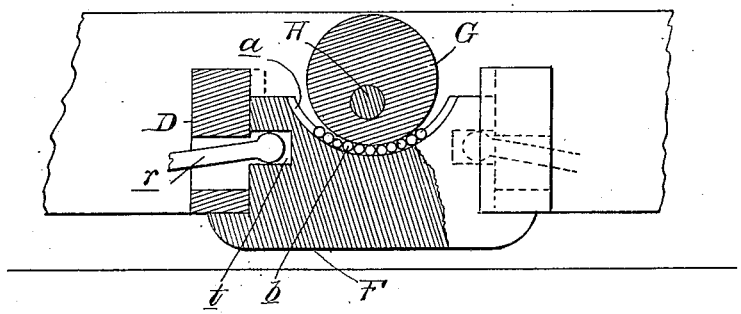
Figure 4:
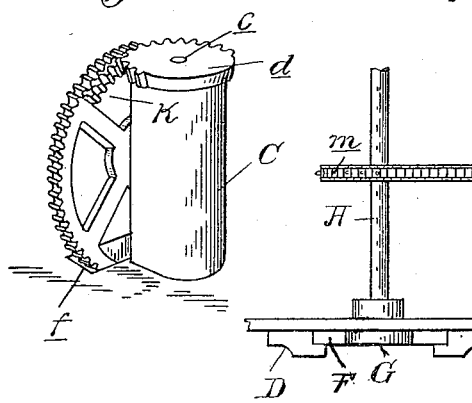
Figure 3:
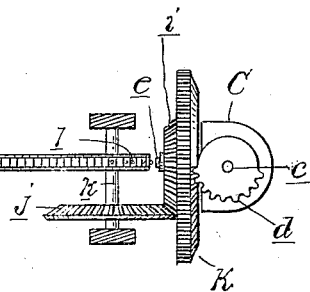

Figure 1 is a sectional elevation of my improved brake, illustrating the same applied to a car. Fig. 2 is a similar view showing the operating device for the track-shoe. Fig. 3 is a diagram plan view of the brake mechanism, illustrating the connections between the single operating device and the shoe; and Fig. 4 is a perspective view of a rheostat or controller and of the common actuating device for the latter and the brakes.

I preferably employ the brake mechanism upon each side of the car; but as the construction of the two parts is identical only one will be described.

The reference-letter A designates an ordinary wheeled truck, and B the flooring thereon, at the forward part of which is located the usual motor rheostat or controller C.

Upon one side of the frame and intermediate the wheel are arranged vertical guides D, secured to said frame by bolts $a^2$, in which is mounted for reciprocatory movement the track-shoe F. The means I employ for moving the shoe into and out of engagement with the track consists, essentially, of a cam-wheel G, which is fixedly secured upon one end of the transverse shaft H, having suitable bearings in the truck-frame. The cam is adapted to bear against the upper face of the shoe F, and the relation between the parts is maintained through the agency of a connecting-link I, the ends $b'$ and $c'$ of which are fixedly secured to the shoe, while the other end is bent at right angles to the ends referred to and engages within a slot J, formed for that purpose within the cam.

In order that a minimum amount of friction will take place between the cam and the shoe, I provide a ball-bearing between the parts. This bearing is constructed by forming a groove $a$ in the top of the shoe and arranging a series of balls $b$ therein.

Any means may be employed for actuating the cam-wheel to produce the result desired; but I preferably employ an actuating device that will successively operate the motor and the brakes. This actuating mechanism will now be described.

The rheostat C is provided with a shaft $c$, and on the top of said shaft is arranged a segmental gear $d$. Mounted upon the stud $e$, extending laterally from the rheostat-casing, is a segmental gear-wheel K, which is adapted at certain times to mesh with the teeth upon the gear-segment $d$. The segment K extends below the flooring through a slot $f$, formed therein for that purpose, and meshes with a gear-wheel $g$, which is fixed upon a stub-shaft $h$, having suitable bearings in hangers depending from the floor.

Fixedly secured to the shaft $h$ or formed integral with the gear-wheel $g$, as is the preferable construction, is a bevel-gear $i$, which is adapted to mesh with the complementary bevel-gear $j$, secured to the transverse shaft $k$, journaled in suitable supports. This latter shaft is provided at its center with a sprocket-wheel $l$, and a sprocket-chain $q$ connects this wheel with a similar sprocket $m$ upon the transverse shaft H.

$o$ designates a handle upon the segmental gear K.

The arrangement of the segmental gears relatively to each other is such that upon movement of the gear-segment K to the right the current of electricity will first be shut entirely off. During this movement of the segment the brake-shoe is gradually lowered into proximity to the rail by means of the gear connection between said shoe and the operating device. Upon further movement of the said gear-segment the brake-shoe will be applied to the rail and the car stopped. It will thus be seen that only a single actuating device is employed for operating the rheostat and the brakes and that at no time can the brakes be applied without first cutting off the current, or vice versa.

In order to obtain an increased amount of friction, I preferably employ, in addition to the track-shoe above described, brake-levers L, which are pivoted by bolts $b^2$ to the sides of the truck-frame, and arrange the same in such manner as to be operated simultaneously with the cam G. The detail construction is as follows: The brake-levers comprise, essentially, operating-arms $r$ and the shoes $s$ upon the complementary arms $s'$, the levers being pivoted at points in proximity to the wheels. The free ends of the arms $r$ of the levers are adapted to engage within recesses $t$ in the track-shoe, as plainly shown in Fig. 2, whereby a loose connection between the shoe and the lever is obtained. The parts are so arranged relatively to each other that when the track-shoe is moved in engagement with the rail the shoes upon the levers will be moved in turn into engagement with the wheels.

From the foregoing description of my invention it will be readily observed that by a simple mechanism I have provided more effective braking apparatus than has heretofore been used and have so arranged the parts as to permit of the said mechanism being readily attached to an electric car of ordinary construction. Likewise by employing a cam arranged and operating in connection with the brake-shoe in the manner shown and described and a gear connection between the cam and the operating device, whereby the former may be moved positively in either direction, the brake-shoe after the act of braking has been effected will remain in proper relation to the rail without any effort on the part of the operator and likewise without the use of any locking device such as heretofore has been necessary.

What I claim as my invention is—

1. In a brake mechanism, the combination with the motor-rheostat, of the track-shoe, a segmental gear-wheel connected to the rheostat, a driven shaft operated by the segment, a cam adapted to bear against and reciprocate the track-shoe, and a drive connection between the driven shaft and the cam, comprising a cam-shaft carrying a sprocket-wheel thereon, a sprocket-wheel upon the driven shaft, and a sprocket-chain connecting the sprocket-wheels.

2. In a brake mechanism, the combination with a car-truck, of a track-shoe mounted thereon intermediate the wheels for reciprocation, said shoe having a recess formed in each side thereof, a brake-lever pivoted to the truck intermediate each wheel and the shoe, one end of each lever extending within the slot in the shoe, and a brake-shoe carried by the other ends of said levers, substantially as described.

In testimony whereof I affix my signature in presence of two witnesses.

FRANZIS M. EGGERT.

Witnesses:
M. B. O'DOGHERTY,
H. C. SMITH.